(12) United States Patent
Yeh et al.

(10) Patent No.: US 11,286,755 B2
(45) Date of Patent: Mar. 29, 2022

(54) HYDROCARBON WELLS INCLUDING CROSSLINKED POLYMER GRANULES IN SAND CONTROL STRUCTURES AND METHODS OF COMPLETING THE HYDROCARBON WELLS

(71) Applicant: ExxonMobil Upstream Research Company, Spring, TX (US)

(72) Inventors: Charles S. Yeh, Spring, TX (US); Robert M. Shirley, The Woodlands, TX (US); Pavlin B. Entchev, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 140 days.

(21) Appl. No.: 16/939,598

(22) Filed: Jul. 27, 2020

(65) Prior Publication Data

US 2021/0047902 A1 Feb. 18, 2021

Related U.S. Application Data

(60) Provisional application No. 62/951,782, filed on Dec. 20, 2019, provisional application No. 62/944,106, (Continued)

(51) Int. Cl.
*E21B 43/04* (2006.01)
*E21B 43/02* (2006.01)
(Continued)

(52) U.S. Cl.
CPC ............ *E21B 43/04* (2013.01); *C09K 8/5753* (2013.01); *E21B 43/025* (2013.01); *E21B 43/082* (2013.01); *E21B 43/10* (2013.01)

(58) Field of Classification Search
None
See application file for complete search history.

(56) References Cited

U.S. PATENT DOCUMENTS

| 2004/0043906 | A1 | 3/2004 | Heath |
| 2007/0209794 | A1 | 9/2007 | Kaufman |

(Continued)

FOREIGN PATENT DOCUMENTS

| WO | 2006135892 A2 | 12/2006 | |
| WO | WO-2016025005 A1 * | 2/2016 | ........... C09K 8/5751 |

OTHER PUBLICATIONS

Gheysari, Dj, The effect of high-energy electron beam on mechanical and thermal properties of LDPE and HDPE, European Polymer Journal, 2001, pp. 295-302, vol. 37.

*Primary Examiner* — Charles R Nold
(74) *Attorney, Agent, or Firm* — Leandro Arechederra, III

(57) ABSTRACT

Hydrocarbon wells including crosslinked polymer granules in sand control structures and/or methods of completing the hydrocarbon wells. The hydrocarbon wells include a wellbore that extends within a subsurface region and a downhole tubular that extends within the wellbore, defines a tubular conduit, and includes a fluid-permeable segment. The hydrocarbon wells also include a sand control structure that is positioned within an annular space that extends between the wellbore and the fluid-permeable segment of the downhole tubular. The sand control structure is configured to restrict migration of formation sands from the subsurface region and into the tubular conduit via the fluid-permeable segment and includes a plurality of crosslinked polymer granules. The methods include positioning a downhole tubular within a wellbore and providing a plurality of crosslinked polymer granules to an annular space that extends between the wellbore and a fluid-permeable segment of the downhole tubular.

21 Claims, 2 Drawing Sheets

Related U.S. Application Data filed on Dec. 5, 2019, provisional application No. 62/904,993, filed on Sep. 24, 2019, provisional application No. 62/888,214, filed on Aug. 16, 2019.

(51) Int. Cl.
*E21B 43/08* (2006.01)
*C09K 8/58* (2006.01)
*C09K 8/575* (2006.01)
*E21B 43/10* (2006.01)

(56) References Cited

U.S. PATENT DOCUMENTS

| | | | |
|---|---|---|---|
| 2008/0142222 A1* | 6/2008 | Howard | B01D 39/1653 |
| | | | 166/228 |
| 2015/0204178 A1 | 7/2015 | Willberg | |
| 2016/0289547 A1* | 10/2016 | Gupta | C09K 8/5756 |
| 2018/0155597 A1* | 6/2018 | Burns | C09K 8/58 |
| 2018/0258743 A1 | 9/2018 | Malbrel | |

* cited by examiner

HYDROCARBON WELLS INCLUDING CROSSLINKED POLYMER GRANULES IN SAND CONTROL STRUCTURES AND METHODS OF COMPLETING THE HYDROCARBON WELLS

CROSS-REFERENCE TO RELATED APPLICATIONS

This application claims the benefit of U.S. Provisional Application 62/888,214 filed Aug. 16, 2019 entitled "Crosslinked Granular Polyethylene", and also claims the benefit of U.S. Provisional Application 62/904,993 filed Sep. 24, 2019 entitled "Granular Crosslinked Polyethylene as a Hydraulic Fracturing Proppant" the entireties of which are incorporated by reference herein. This application also claims the benefit of U.S. Provisional Application 62/944,106, filed Dec. 5, 2019 entitled "Highly Crosslinked Polymer Particulate" and U.S. Provisional Application 62/951,782, filed Dec. 20, 2019, entitled "Hydrocarbon Wells Including Crosslinked Polymer Granules in Sand Control Structures and Methods of Completing the Hydrocarbon Wells" the entireties of which are incorporated by reference herein. This application is also related to U.S. Provisional Application 62/888,221 filed Aug. 16, 2019 entitled "Method of Manufacturing Crosslinked Granular Polyethylene", the entirety of which is incorporated by reference herein. This application is also related to U.S. Provisional Application 62/890,188 filed Aug. 22, 2019 entitled "Granular Crosslinked Polyethylene as a Density Modifier in a Wellbore Operation Fluid Mixture", the entirety of which is incorporated by reference herein. This application is also related to U.S. Provisional Application 62/890,186 filed Aug. 22, 2019 entitled "Granular Crosslinked Polyethylene as a Loss Circulation Material in a Wellbore Operation Fluid", the entirety of which is incorporated by reference herein. This application is also related to U.S. Provisional Application 62/890,185 filed Aug. 22, 2019 entitled "Granular Crosslinked Polyethylene as a Hydraulic Fracturing Proppant", the entirety of which is incorporated by reference herein.

This application is also related to U.S. Provisional Application 62/943,978, filed Dec. 5, 2019 entitled "Methods of Manufacturing Highly Crosslinked Polymer Particulate." This application is also related to U.S. Provisional Application 62/949,302, filed Dec. 17, 2019 entitled "Highly Crosslinked Polymer Particulate and Methods of Manufacturing Highly Crosslinked Polymer Particulate."

FIELD OF THE DISCLOSURE

The present disclosure relates generally to hydrocarbon wells and/or methods of completing hydrocarbon wells and more particularly to hydrocarbon wells and/or methods that utilize crosslinked polymer granules in sand control structures.

BACKGROUND OF THE DISCLOSURE

During completion of a wellbore of a hydrocarbon well, a sand control structure may be formed between a tubular conduit of the hydrocarbon wells and a wellbore within which extends a downhole tubular that defines the tubular conduit. Such sand control structures generally are referred to as gravel packs and utilize specifically sized gravel to restrict migration of formation sands from a subsurface region that includes the wellbore into the tubular conduit. While effective under certain circumstances, gravel is relatively heavy. As such, it may be challenging to form the sand control structures in relatively longer wellbores. Additionally or alternatively, any interruption in gravel placement may result in gravel settling and/or an inability to effectively form the sand control structure. Thus, there exists a need for hydrocarbon wells with improved sand control structures and/or for methods of completing the hydrocarbon wells.

SUMMARY OF THE DISCLOSURE

Hydrocarbon wells including crosslinked polymer granules in sand control structures and/or methods of completing the hydrocarbon wells are disclosed herein. The hydrocarbon wells include a wellbore that extends within a subsurface region and a downhole tubular that extends within the wellbore, defines a tubular conduit, and includes a fluid-permeable segment. The hydrocarbon wells also include a sand control structure that is positioned within an annular space that extends between the wellbore and the fluid-permeable segment of the downhole tubular. The sand control structure is configured to restrict migration of formation sands from the subsurface region into the tubular conduit via the fluid-permeable segment. The sand control structure includes a plurality of crosslinked polymer granules.

The methods include positioning a downhole tubular within a wellbore of a hydrocarbon well. The wellbore extends within a subsurface region, and the downhole tubular defines a tubular conduit and includes a fluid-permeable segment. The methods also include providing a plurality of crosslinked polymer granules to an annular space that extends between the wellbore and a fluid-permeable segment of the downhole tubular. The sand control structure is configured to restrict migration of formation sands from the subsurface region into the tubular conduit via the fluid-permeable segment.

A characteristic dimension of the plurality of crosslinked polymer granules may be at least 250 micrometers and at most 2 millimeters. Each crosslinked polymer granule may contain a highly crosslinked polymeric material. The highly crosslinked polymeric material may include a plurality of polyethylene polymer chains and a plurality of chemical crosslinks. The plurality of chemical crosslinks may include chemical crosslinks that covalently bond a given polyethylene polymer chain of the plurality of polyethylene polymer chains to another polyethylene polymer chain of the plurality of polyethylene polymer chains.

DETAILED DESCRIPTION AND BEST MODE OF THE DISCLOSURE

Figure 1:
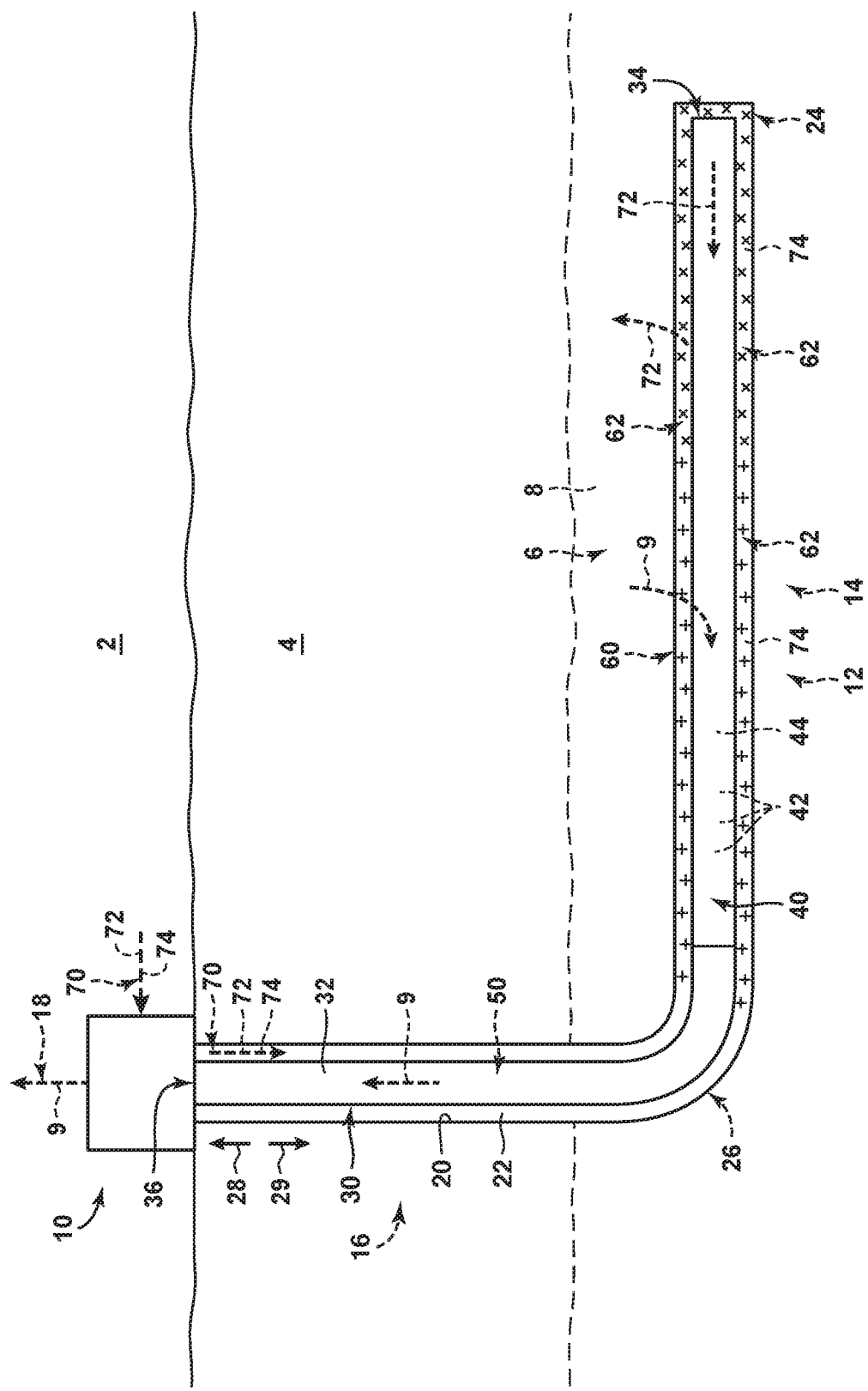
FIG. 1 is a schematic illustration of examples of hydrocarbon wells according to the present disclosure.
Figure 2:
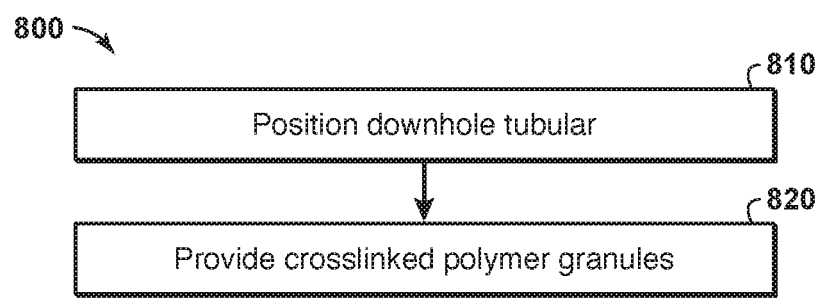
FIG. 2 is a flowchart depicting examples of methods of completing a hydrocarbon well, according to the present disclosure.
Figure 3:
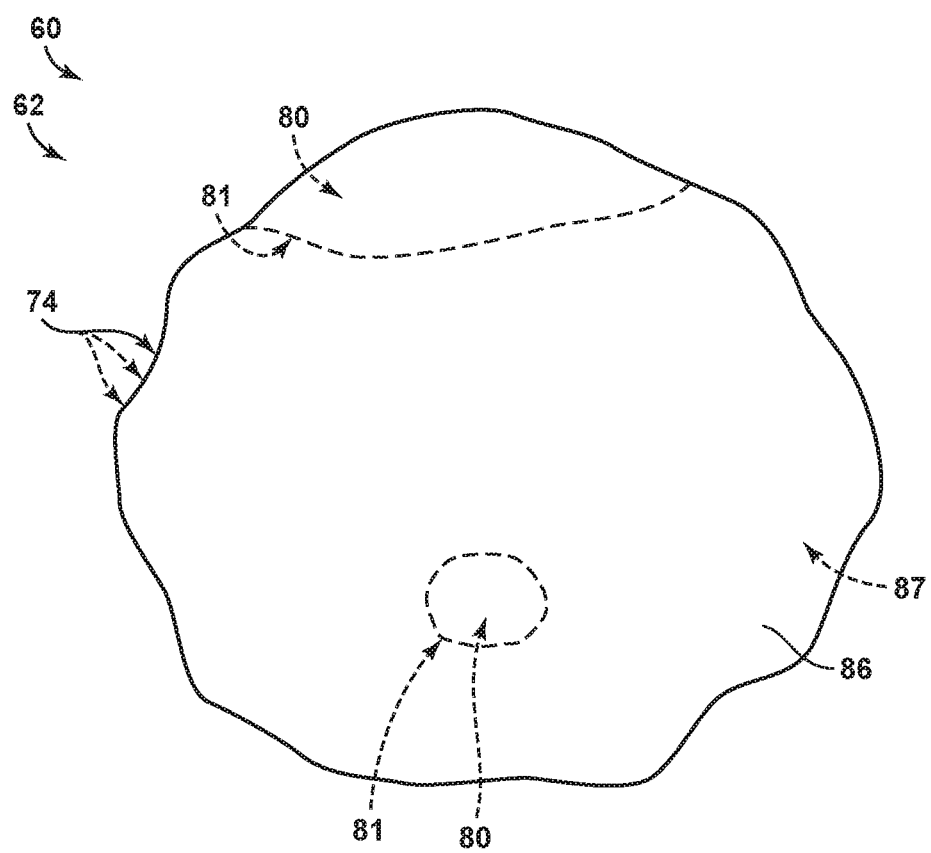
FIG. 3 is a schematic illustration of examples of a plurality of crosslinked polymer granules that may form a portion of sand control structures, according to the present disclosure.

FIGS. 1-3 provide examples of hydrocarbon wells 10, of methods 800, and/or of crosslinked polymer granules 74 that may be included in hydrocarbon wells 10 and/or utilized with methods 800, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of hydrocarbon wells 10 according to the present disclosure. Hydrocarbon wells 10 include a wellbore 20 that extends within a subsurface region 4. Wellbore 20 additionally or alternatively may be referred to herein as extending between a surface region 2 and subsurface region 4 and/or as extending at least partially within and/or as being at least partially defined by an unconsolidated sand formation 6 that includes formation sands 8. Hydrocarbon wells 10 also include a downhole tubular 30 that extends within the wellbore. Downhole tubular 30 defines and/or bounds a tubular conduit 32, and wellbore 20 and downhole tubular 30 may be referred to herein as defining and/or bounding an annular space 22 therebetween. Downhole tubular 30 includes at least one fluid-permeable segment 40.

Hydrocarbon well 10 further includes a sand control structure 60. Sand control structure 60 is positioned within annular space 22 and is configured to restrict migration of formation sands 8 from subsurface region 4 and/or into tubular conduit 32 via fluid-permeable segment 40 of the downhole tubular. Sand control structure 60 may extend and/or be positioned within unconsolidated sand formation 6, when present. Sand control structure 60 includes a plurality of crosslinked polymer granules 74, examples of which are disclosed herein. Sand control structure 60 may be referred to herein as including an aggregate 62 that includes and/or is the plurality of crosslinked polymer granules 74.

During operation of hydrocarbon wells 10, a wellbore fluid 9 may flow from subsurface region 4 and/or from unconsolidated sand formation 6 into tubular conduit 32 via sand control structure 60 and fluid-permeable segment 40. With this in mind, sand control structure 60 and/or crosslinked polymer granules 74 thereof may be shaped, sized, and/or positioned such that the sand control structure blocks, resists, and/or obstructs flow and/or migration of formation sands 8 with wellbore fluid 9 and/or into the tubular conduit. As such, the presence of sand control structure 60 may decrease a potential for migration of the formation sands into the tubular conduit, may decrease a potential for blockage of the tubular conduit by the formation sands, and/or may decrease a potential for production of the formation sands from the hydrocarbon well in and/or within a produced fluid stream 18 that includes wellbore fluid 9.

In some examples, hydrocarbon well 10 may include an open-hole completion section 12, and fluid-permeable segment 40 of downhole tubular 30 and/or sand control structure 60 may be positioned within and/or may at least partially define the open-hole completion section. As used herein, the phrase "open-hole completion section" refers to a section and/or region of hydrocarbon well 10 that is configured to produce wellbore fluid 9 but that does not include a casing and/or liner that cases and/or lines wellbore 20.

In some examples, hydrocarbon well 10 may include a horizontal, or a deviated, portion 14 and/or a vertical portion 16. FIG. 1 illustrates fluid-permeable segment 40 of downhole tubular 30 and sand control structure 60 positioned within horizontal portion 14. However, it is also within the scope of the present disclosure that fluid-permeable segment 40 and/or sand control structure 60 may be positioned within vertical portion 16. Similarly, the open-hole completion section, when present, may be positioned within horizontal portion 14 and/or within vertical portion 16.

During formation of hydrocarbon wells 10, and as discussed in more detail herein with reference to methods 800 of FIG. 2, downhole tubular 30 may be positioned within wellbore 20. Subsequently, crosslinked polymer granules 74 may be provided to annular space 22, such as to form and/or define sand control structure 60. In some examples, crosslinked polymer granules 74 may be provided to the annular space in and/or within a slurry 70 that includes a carrier fluid 72. Carrier fluid 72 then may flow into subsurface region 4 and/or to surface region 2, such as within tubular conduit 32. Examples of carrier fluid 72 include water, brine, a hydrocarbon fluid, a crosslinked gel, a clarified xanthum gum gel, a hydroxyethylcellulose gel, and/or a foam.

In some examples, a first subset of the plurality of crosslinked polymer granules 74 may define a first portion of sand control structure 60 that may be positioned within a toe region 24 of wellbore 20, as indicated by X's in FIG. 1. In such examples, a second subset of the plurality of crosslinked polymer granules 74 may define a second portion of sand control structure 60 that may extend between the first portion of the sand control structure and a heel region 26 of the wellbore, as indicated by +'s in FIG. 1. In some examples, the first subset of the plurality of crosslinked polymer granules may be provided to the annular space via a first slurry, which may be provided to the annular space prior to a second slurry that includes the second subset of the plurality of crosslinked polymer granules. In some examples, a single slurry may be utilized to define an entirety of the sand control structure.

As discussed in more detail herein, the plurality of crosslinked polymer granules may have, or naturally may have, a granule density that may be matched, or at least substantially matched, to a carrier fluid density of the carrier fluid. Additionally or alternatively, and as also discussed, the density of the plurality of crosslinked polymer granules may be tailored and/or selected to correspond to the carrier fluid density. This is in direct contrast to conventional aggregate, such as gravel, that may be utilized to form and/or define conventional sand control structures in conventional hydrocarbon wells.

Lightweight, or relatively lighter weight, aggregate 62 and/or crosslinked polymer granules 74 utilized in hydrocarbon wells 10, according to the present disclosure, may have and/or exhibit benefits over conventional aggregate that is utilized to form conventional sand control structures. As an example, crosslinked polymer granules 74 may have a lower settling velocity and/or may more readily remain suspended within carrier fluid 72 when compared to the conventional aggregate. This may permit and/or facilitate formation of relatively longer sand control structures, such as may be beneficial within extended-reach hydrocarbon wells. Additionally or alternatively, this also may decrease a potential for blockage of perforation tunnels and/or may permit lower viscosity carrier fluids to be utilized. The combination of the lower density and the lower viscosity carrier fluids may decrease needed flow velocities for slurry 70 and/or may decrease pumping costs. The lower flow velocities may decrease a potential for formation fracture, may decrease fines migration, and/or may decrease shale spalling during sand control structure formation.

In some examples, crosslinked polymer granules 74 may be at least substantially neutrally buoyant within carrier fluid 72. In such examples, significant flexibility may be achieved in the pumps schedule utilized to form the sand control structure. As an example, if pumping is stopped, the crosslinked polymer granules will remain suspended within the carrier fluid, thereby decreasing a potential for blockage and/or dune formation.

In some examples, crosslinked polymer granules 74 may include a positively buoyant subset and/or a negatively buoyant subset. In such examples, the positively buoyant subset of the plurality of crosslinked polymer granules 74 may be positively buoyant within the carrier fluid, while the negatively buoyant subset of the plurality of crosslinked polymer granules may be negatively buoyant within the carrier fluid. Such a configuration may permit and/or facilitate formation of an entirety of the sand control structure in a single wave, as discussed in more detail herein.

Downhole tubular 30 may include any suitable structure that defines tubular conduit 32 and/or that includes fluid-permeable segment 40. As examples, at least a portion of downhole tubular 30 may include and/or be formed by a pipe and/or a section of pipe. As illustrated in FIG. 1, fluid-permeable segment 40 may form and/or define a downhole end region 34 of downhole tubular 30. Examples of fluid-permeable segment 40 include a screen structure 44 and/or a perforated pipe that includes a plurality of apertures 42. Screen structure 44 and/or apertures 42 may be configured to permit fluid flow therethrough and/or into tubular conduit 32. Apertures 42 and/or screen structure 44 may be sized to decrease a potential for migration of crosslinked polymer granules 74 into tubular conduit 32. As an example, a maximum extent of each aperture may be less than a characteristic dimension of each crosslinked polymer granule, examples of which are disclosed herein.

As illustrated in dashed lines in FIG. 1, downhole tubular 30 may include a fluid-impermeable segment 50. Fluid-impermeable segment 50, when present, may define tubular conduit 32 and/or may permit fluid flow within the tubular conduit. However, fluid-impermeable segment 50 may not include apertures 42, may not include screen structure 40, and/or may be configured to restrict and/or block fluid flow into the tubular conduit from external the tubular conduit. Fluid-impermeable segment 50, when present, may form and/or define an uphole end region 36 of downhole tubular 30.

Subsurface region 4 and/or unconsolidated sand formation 6 thereof may have and/or define a median formation grain diameter, such as a median particle size, or diameter, of formation sands 8. In some examples, the characteristic dimension of each crosslinked polymer granule 74 may be selected based, at least in part, on the median formation grain diameter. As examples, the characteristic dimension of each crosslinked polymer granule may be at least 2, at least 3, at least 4, at least 5, at least 6, at most 10, at most 9, at most 8, at most 7, at most 6, at most 5, and/or at most 4 times larger than the median formation grain diameter.

FIG. 2 is a flowchart depicting examples of methods 800 of completing a hydrocarbon well, according to the present disclosure. Methods 800 include positioning a downhole tubular at 810 and providing crosslinked polymer granules at 820.

Positioning the downhole tubular at 810 may include positioning the downhole tubular within a wellbore of a hydrocarbon well. The wellbore may extend within a subsurface region, and the downhole tubular may define a tubular conduit that includes a fluid-permeable segment. Examples of the wellbore, the subsurface region, and the downhole tubular are disclosed herein with reference to wellbore 20, subsurface region 4, and downhole tubular 30, respectively, of FIG. 1. Subsequent to the positioning at 810, the downhole tubular may extend within the wellbore, as illustrated in FIG. 1.

The positioning at 810 may be performed and/or accomplished in any suitable manner. As an example, the positioning at 810 may include operatively translating the downhole tubular within the wellbore, along a length of the wellbore, and/or in a downhole direction. This may include positioning such that the downhole tubular and/or the tubular conduit extend from a surface region and/or to a toe region of the hydrocarbon well. Examples of the surface region and the toe region are disclosed herein with reference to surface region 2 and toe region 24 of FIG. 1. An example of the downhole direction is illustrated in FIG. 1 and indicated at 29. In general, the downhole direction may refer to a direction that is along the length of wellbore 20 and points away from surface region 2, points away from an uphole end region 36 of the downhole tubular, points toward a downhole end region 34 of the downhole tubular, and/or is opposed to an uphole direction 28.

The positioning at 810 additionally or alternatively may include positioning the fluid-permeable segment of the downhole tubular within a horizontal portion of the wellbore and/or positioning the fluid-permeable segment of the downhole tubular within an open-hole portion of the wellbore (e.g., a portion of the wellbore that defines an open-hole completion). In some examples, and as discussed, the subsurface region may include an unconsolidated sand formation that may at least partially define the wellbore. In these examples the positioning at 810 may include positioning the fluid-permeable segment within the unconsolidated sand formation and/or within a region of the wellbore that is defined by the unconsolidated sand formation.

Providing the crosslinked polymer granules at 820 may include providing a plurality of crosslinked polymer granules to an annular space that extends between the wellbore and the fluid-permeable segment. This may include providing the plurality of crosslinked polymer granules to form, to define, and/or to establish a sand control structure of the hydrocarbon well and/or within the annular space. The sand control structure may be configured to restrict migration of formation sands from the subsurface region and/or into the tubular conduit via the fluid-permeable segment of the downhole tubular. Examples of the plurality of crosslinked polymer granules are disclosed herein with reference to crosslinked polymer granules 74 of FIGS. 1 and 3. Examples of the annular space and the sand control structure are disclosed herein with reference to annular space 22 and sand control structure 60, respectively, of FIG. 1.

In some examples, the providing at 820 may include providing a slurry, which includes the plurality of crosslinked polymer granules and a carrier fluid, to the annular space. In some such examples, the providing at 820 further may include depositing the plurality of crosslinked polymer granules within the annular space, such as via at least partial separation of the plurality of crosslinked polymer granules from the carrier fluid, to form and/or define the sand control structure. Examples of the slurry and the carrier fluid are disclosed herein with reference to slurry 70 and carrier fluid 72, respectively, of FIG. 1. In such examples, the providing at 820 further may include flowing the carrier fluid into the subsurface region and/or flowing the carrier fluid to the surface region, such as within the tubular conduit of the downhole tubular.

As discussed, a granule density of the plurality of crosslinked polymer granules may be matched, or at least substantially matched, to a carrier fluid density of the carrier fluid. Additionally or alternatively, the granule density may be within a threshold density range that may include the carrier fluid density. As examples, the granule density may be at least 75%, at least 80%, at least 85%, at least 90%, at least 95%, at least 99%, at least 100%, at least 101%, at least 105%, at least 110%, at least 115%, at most 200%, at most 175%, at most 150%, at most 125%, at most 120%, at most 115%, at most 110%, at most 105%, at most 101%, at most 100%, at most 99%, and/or at most 95% of the carrier fluid density.

In some examples, the plurality of crosslinked polymer granules may be neutrally, or at least substantially neutrally, buoyant within the carrier fluid. Such a configuration may decrease a potential for settling and/or separation of the plurality of crosslinked polymer granules from the carrier fluid during the providing at 820. In some examples, the plurality of crosslinked polymer granules may be positively buoyant within the carrier fluid. Such a configuration may cause the plurality of crosslinked polymer granules to preferentially distribute within vertically higher regions of the wellbore. In some examples, the plurality of crosslinked polymer granules may be negatively buoyant within the carrier fluid. Such a configuration may cause the plurality of crosslinked polymer granules to preferentially distribute in vertically lower regions of the wellbore. In some examples, a positively buoyant fraction of the plurality of crosslinked polymer granules may be positively buoyant within the carrier fluid, while a negatively buoyant fraction of the plurality of crosslinked polymer granules may be negatively buoyant within the carrier fluid. Such a configuration may produce and/or generate more complete deposition of the plurality of crosslinked polymer granules within all desired regions of the wellbore.

In some examples, the providing at 820 may include providing a first slurry to the annular space and subsequently providing a second slurry to the annular space. When performed within conventional hydrocarbon wells utilizing conventional aggregate, such a configuration may be known as alpha-beta wave placement of the aggregate. The providing the first slurry may include forming a first portion of the sand control structure. The first portion of the sand control structure may be proximate the toe region of the wellbore, and an example of the first portion of the sand control structure is illustrated with X's in FIG. 1. In these examples, the providing the second slurry may include forming a second portion of the sand control structure. The second portion of the sand control structure may extend from the first portion of the sand control structure to and/or toward a heel region of the wellbore, and an example of the second portion of the sand control structure is illustrated with +'s in FIG. 1.

Also in these examples, the first slurry may differ from the second slurry. As an example, a first slurry density of the first slurry may be greater than a second slurry density of the second slurry. As another example, a first granule density of a first granule subset of the plurality of crosslinked polymer granules, which is provided within the first slurry, may be greater than a second granule density of a second granule subset of the plurality of crosslinked polymer granules, which is provided within the second slurry. As yet another example, the first granule subset may be negatively buoyant within a first corresponding carrier fluid that at least partially defines the first slurry. As another example, the second granule subset may be positively buoyant within a second corresponding carrier fluid that at least partially defines the second slurry.

In some examples, a first granule subset of the plurality of crosslinked polymer granules may have and/or define a first average granule density, which may be greater than a carrier fluid density of the carrier fluid. In addition, a second granule subset of the plurality of crosslinked polymer granules may have and/or define a second average granule density that differs from, or is less than, the first average granule density and/or that is less than the carrier fluid density. In some such examples, the providing at 820 may include providing such that the first granule subset is preferentially distributed within the toe region of the wellbore and/or such that the second granule subset is preferentially distributed between the toe region and the heel region of the wellbore. This may include concurrently providing both the first granule subset and the second granule subset, within the carrier fluid, and a density difference between the first granule subset and the second granule subset may cause the first granule subset to be preferentially distributed within the toe region and also may cause the second granule subset to be preferentially distributed between the toe region and the heel region.

FIG. 3 is a schematic illustration of examples of a plurality of crosslinked polymer granules 74 that may form a portion of sand control structures 60 and/or that may define aggregate 62, according to the present disclosure. Crosslinked polymer granules 74 of FIG. 3 may include and/or be a more detailed illustration of crosslinked polymer granules 74 illustrated in FIG. 1 and/or of the crosslinked polymer granules discussed herein with reference to methods 800 of FIG. 2. With this in mind, any of the structures, functions, and/or features of crosslinked polymer granules 74 that are discussed herein with reference to FIG. 3 may be included in and/or utilized with the crosslinked polymer granules of FIGS. 1-2 without departing from the scope of the present disclosure. Similarly, any of the structures, functions, and/or features that are discussed herein with reference to the crosslinked polymer granules of FIGS. 1-2 may be included in and/or utilized with crosslinked polymer granules 74 of FIG. 3 without departing from the scope of the present disclosure.

As illustrated in FIG. 3, crosslinked polymer granules 74 each contain, or each crosslinked polymer granule of the plurality of crosslinked polymer granules contains, a polymeric material 86, which also may be referred to herein as a crosslinked polymeric material 86 and/or as a highly crosslinked polymeric material 86. The highly crosslinked polymeric material 86 includes a plurality of polyethylene polymer chains and a plurality of chemical crosslinks. The plurality of chemical crosslinks includes chemical crosslinks that covalently bond a given polyethylene polymer chain of the plurality of polyethylene polymer chains to another polyethylene polymer chain of the plurality of polyethylene polymer chains.

In some examples, the plurality of polyethylene polymer chains may include a plurality of linear polyethylene polymer chains. In some examples, each polyethylene polymer chain of the plurality of polyethylene polymer chains includes a plurality of methylene repeat units and/or a plurality of ethylene repeat units covalently bonded to one another to form a plurality of carbon-carbon bonds.

In some examples, at least a subset of the plurality of polyethylene polymer chains includes a branched polymer chain. The branched polymer chain may include at least one branch group, which may extend from a polymer backbone of the branched polymer chain. In some such examples, a given chemical crosslink of the plurality of chemical crosslinks may extend from the at least one branch group.

The at least one branch group, when present, may include any suitable number of carbon atoms and/or may have any suitable length. As examples, the at least one branch group may include at least 10, at least 25, at least 50, at least 100, at least 500, at least 1,000, at least 5,000, at least 10,000, at least 25,000, and/or at least 50,000 carbon atoms. The carbon atoms that form the at least one branch group may be arranged linearly, such as along a branch group backbone of the at least one branch group. Alternatively, the carbon atoms that form the at least one branch group may, themselves, form sub-branches. Stated another way, the at least one branch group may, itself, be branched.

In some examples, at least a subset of the plurality of polyethylene polymer chains includes a pendant group that extends from the polymer backbone of the subset of the plurality of polyethylene polymer chains. In some such examples, a given chemical crosslink of the plurality of chemical crosslinks may extend from the pendant group. The pendant group, when present, may include any suitable number of carbon atoms. As examples, the pendant group may include at least 1, at least 2, at least 3, at least 4, at least 5, at least 6, at least 7, at least 8, at least 10, at least 15, at least 20, at most 50, at most 40, at most 30, at most 20, at most 15, at most 12, at most 10, at most 8, and/or at most 6 carbon atoms.

The pendant group may have and/or define any suitable structure, including linear structures, branched structures, cyclic structures, and/or combinations thereof. A specific example of the pendant group includes pendant groups that may decrease, or limit, a degree of crosslinking of the plurality of crosslinked polymer granules, such as via increasing a minimum distance between adjacent polyethylene polymer chains and/or by making it difficult for the polymer backbones of adjacent polyethylene polymer chains to closely pack. Examples of such pendant groups include a methyl group, an ethyl group, a propyl group, a butyl group, a pentyl group, a hexyl group, a heptyl group, an octyl group, a nonyl group, and/or a decyl group.

In some examples, and prior to formation of the plurality of chemical crosslinks, the pendant group may include a ring, a cyclic structure, and/or a double bond, which may permit and/or facilitate formation of a corresponding chemical crosslink. Examples of such pendant groups include a cyclic hydrocarbon, a bridged cyclic hydrocarbon, a norbornene-derived pendant group, an ethylidene-derived pendant group, and/or a vinyl norbornene-derived pendant group.

The plurality of polyethylene polymer chains may be highly crosslinked via the plurality of chemical crosslinks. The plurality of polyethylene polymer chains may have and/or define any suitable degree of crosslinking, or average degree of crosslinking. Examples of the average degree of crosslinking include at least 0.01%, at least 0.1%, at least 1%, at least 2%, at least 3%, at least 4%, at least 5%, at least 6%, at least 8%, at least 10%, at least 12%, at least 14%, at least 16%, at least 18%, at least 20%, at least 25%, at least 30%, at least 35%, at least 40%, at least 45%, and/or at least 50%. In some examples, the highly crosslinked polymeric material within a given crosslinked polymer granule may be so highly crosslinked that the given crosslinked polymer granule may be defined by, at least substantially entirely by, or even entirely by a single polymeric molecule.

As used herein, the phrase "degree of crosslinking" may refer to a mole percentage, or an average mole percentage, of repeat units within a given polyethylene polymer chain that are crosslinked to another polyethylene polymer chain. For example, a polyethylene polymer chain with 100 repeat units and one crosslink would exhibit a "degree of crosslinking" of $1/100 = 1\%$. Similarly, a polyethylene polymer chain with 100 repeat units and 10 crosslinks would exhibit a "degree of crosslinking" of $10/100 = 10\%$.

Each chemical crosslink may extend from any suitable portion of a given polyethylene polymer chain to any suitable portion of another polyethylene polymer chain. For example, a chemical crosslink may extend from an ethylene repeat unit of a given polyethylene polymer chain to an ethylene repeat unit of another polyethylene polymer chain to form a covalent bond therebetween. As another example, for examples in which at least a subset of the plurality of polyethylene polymer chains includes a pendant group, a chemical crosslink may extend from a portion of a pendant group included in a given polyethylene polymer chain to a pendant group of another polyethylene polymer chain. Alternatively, the chemical crosslink may extend from a polymer backbone of a given polyethylene polymer chain to a pendant group of another polyethylene polymer chain.

In some examples, the plurality of chemical crosslinks may be distributed, evenly distributed, or even homogeneously distributed throughout the plurality of crosslinked polymer granules. Stated another way, and in these examples, the plurality of chemical crosslinks may be distributed throughout the plurality of crosslinked polymer granules.

In some examples, the plurality of chemical crosslinks may be heterogeneously distributed within each crosslinked polymer granule, such as when the plurality of chemical crosslinks is preferentially distributed proximate an external surface of each crosslinked polymer granule. Stated another way, each crosslinked polymer granule may include an external shell that exhibits a higher degree of crosslinking relative to a remainder of the crosslinked polymer granule.

The plurality of crosslinked polymer granules may have and/or define any suitable structure. As examples, the plurality of crosslinked polymer granules may include and/or be a plurality of high density polyethylene granules and/or a plurality of crosslinked high density polyethylene granules.

In addition, the plurality of crosslinked polymer granules may have and/or define any suitable shape. As examples, the plurality of crosslinked polymer granules may include a plurality of irregularly shaped crosslinked polymer granules, a plurality of spheroid-shaped crosslinked polymer granules, a plurality of at least partially spherical crosslinked polymer granules, a plurality of spherical crosslinked polymer granules, a plurality of at least partially cylindrical crosslinked polymer granules, a plurality of cylindrical crosslinked polymer granules, and/or a plurality of rod-shaped crosslinked polymer granules. In some examples, the plurality of crosslinked polymer granules may include polyethylene particles produced by a polyethylene reactor and subsequently crosslinked to form the plurality of crosslinked polymer granules.

The plurality of crosslinked polymer granules may include recycled polyethylene. As an example, the plurality of crosslinked polymer granules may include at least a threshold fraction of a post-consumer granular polymeric material. Examples of the threshold fraction of the post-consumer granular polymeric material include 5 weight percent, 10 weight percent, 15 weight percent, 20 weight percent, 25 weight percent, 30 weight percent, 40 weight percent, 50 weight percent, 60 weight percent, 70 weight percent, 80 weight percent, 90 weight percent, 95 weight percent, 99 weight percent, and/or 100 weight percent.

A characteristic dimension of each crosslinked polymer granule is within a threshold characteristic dimension range of at least 10 micrometers and at most 5 millimeters. As more specific examples, a lower limit of the characteristic dimension range may be at least 10 micrometers, at least 15 micrometers, at least 20 micrometers, at least 25 micrometers, at least 30 micrometers, at least 40 micrometers, at least 50 micrometers, at least 75 micrometers, at least 100 micrometers, at least 125 micrometers, at least 150 micrometers, at least 200 micrometers, at least 250 micrometers, at least 300 micrometers, at least 400 micrometers, at least 500 micrometers, at least 600 micrometers, at least 700 micrometers, at least 800 micrometers, at least 900 micrometers, and/or at least 1,000 micrometers. Additionally or alternatively, an upper limit of the characteristic dimension range may be at most 5 millimeters, at most 3.5 millimeters, at most 3 millimeters, at most 2.5 millimeters, at most 2 millimeters, at most 1.5 millimeters, at most 1.25 millimeters, at most 1 millimeter, at most 900 micrometers, at most 800 micrometers, at most 700 micrometers, at most 600 micrometers, at most 500 micrometers, at most 400 micrometers, and/or at most 300 micrometers.

Examples of the characteristic dimension include a maximum extent of each crosslinked polymer granule and/or a diameter of each crosslinked polymer granule. Additional examples of the characteristic dimension include an effective diameter of each crosslinked polymer granule and/or a minimum diameter of a sphere that fully contains each crosslinked polymer granule.

As illustrated in dashed lines in FIG. 3, the plurality of crosslinked polymer granules 74 may contain a property-modifying filler 80. The property-modifying filler 80, when present, may be configured to modify at least one property of the plurality of crosslinked polymer granules 74. This property modification may be relative and/or compared to a corresponding crosslinked polymer granule that includes the highly crosslinked polymeric material but that does not include the property-modifying filler. With this in mind, crosslinked polymer granules 74 that include property-modifying filler 80, according to the present disclosure, also may be referred to herein as filled crosslinked polymer granules 74, filled highly crosslinked polymer granules, modified highly crosslinked polymer granules 74, and/or property-modified highly crosslinked polymer granules 74. Property-modifying filler 80 additionally or alternatively may be referred to herein as a property-modifying material 80 and/or as property-modifying additive 80.

Property-modifying filler 80 may include any suitable material and/or materials that may modify, that may be configured to modify, and/or that may be selected to modify and/or to selectively modify the at least one property of the plurality of crosslinked polymer granules. Examples of the property-modifying filler include silica, talc, carbon black, a tracer material, a glass fiber, a metal, and/or another polymer (e.g., other than polyethylene). Additional examples of the property-modifying filler include conventional crosslinked polymer granules, examples of which are disclosed herein. Examples of the tracer material include a radio frequency identification tag, a chemical tracer material that is chemically distinct from a remainder of the crosslinked polymer granules, and/or a radioactive tracer material.

In some examples, the property-modifying filler may be distributed, may be uniformly distributed, and/or may be homogeneously distributed in and/or within each crosslinked polymer granule 74. In some examples, each crosslinked polymer granule 74 may include at least one property-modifying filler domain 81 and at least one highly crosslinked polymeric material domain 87. In some such examples, the at least one property-modifying filler domain and the at least one highly crosslinked polymeric material domain may be adhered to one another to form and/or define a corresponding crosslinked polymer granule. In some examples, the at least one highly crosslinked polymeric material domain may surround and/or encapsulate the at least one property-modifying filler domain. In some examples, the at least one property-modifying filler domain may surround and/or encapsulate the at least one highly crosslinked polymeric material domain.

It is within the scope of the present disclosure that the property-modifying filler may modify the at least one property of the plurality of crosslinked polymer granules. As an example, a composition of the property-modifying filler may be selected such that the at least one property of the plurality of crosslinked polymer granules is within a desired property range and/or such that the at least one property of the plurality of crosslinked polymer granules is greater or less than a corresponding property of the highly crosslinked polymeric material. As another example, a weight percentage of the property-modifying filler within the plurality of crosslinked polymer granules may be selected such that the at least one property of the plurality of crosslinked polymer granules is within the desired property range, such that the at least one property of the plurality of crosslinked polymer granules is greater than the corresponding property of the highly crosslinked polymeric material, or such that the at least one property of the plurality of crosslinked polymer granules is less than the corresponding property of the highly crosslinked polymeric material.

The at least one property of the plurality of crosslinked polymer granules may include and/or be any suitable, desired, and/or selected property of the plurality of crosslinked polymer granules. As examples, the at least one property of the plurality of crosslinked polymer granules may include one or more of a thermal stability of the plurality of crosslinked polymer granules, a glass transition temperature of the plurality of crosslinked polymer granules, a mechanical hardness of the plurality of crosslinked polymer granules, a mechanical strength of the plurality of crosslinked polymer granules, a Young's Modulus of the plurality of crosslinked polymer granules, a resistance to oil absorption of the plurality of crosslinked polymer granules, a traceability of detectability of the plurality of crosslinked polymer granules, a magnetic property of the plurality of crosslinked polymer granules, a chemical property of the plurality of crosslinked polymer granules, an electrical property of the plurality of crosslinked polymer granules, and/or a chemical reactivity of the plurality of crosslinked polymer granules. In such examples, the corresponding property of the highly crosslinked polymeric material may include and/or be a thermal stability of the highly crosslinked polymeric material, a glass transition temperature of the highly crosslinked polymeric material, a mechanical hardness of the highly crosslinked polymeric material, a mechanical strength of the highly crosslinked polymeric material, a Young's Modulus of the highly crosslinked polymeric material, a resistance to oil absorption of the highly crosslinked polymeric material, a traceability of detectability of the highly crosslinked polymeric material, a magnetic property of the highly crosslinked polymeric material, a chemical property of the highly crosslinked polymeric material, an electrical property of the highly crosslinked polymeric material, and/or a chemical reactivity of the highly crosslinked polymeric material.

As a more specific example, the at least one property of the plurality of crosslinked polymer granules may include and/or be a density of the plurality of crosslinked polymer granules. As an example, a composition of the property-modifying filler and/or a weight percentage of the property-modifying filler within the plurality of crosslinked polymer granules may be selected such that the density of the plurality of crosslinked polymer granules is within a desired density range. In some examples, the desired density range may be greater than a polymeric material density of the highly crosslinked polymeric material. Stated another way, a filler density of the property-modifying filler may be greater than the polymeric material density. In some examples, the desired density range may be less than the polymeric material density of the highly crosslinked polymeric material. Stated another way, the filler density may be less than the polymeric material density of the highly crosslinked polymeric material.

Examples of a lower bound, or limit, on the desired density range include a lower bound of at least 0.7 grams per cubic centimeter (g/cc), at least 0.75 g/cc, at least 0.8 g/cc, at least 0.85 g/cc, at least 0.9 g/cc, at least 0.95 g/cc, at least 1.0 g/cc, at least 1.05 g/cc, at least 1.25 g/cc, at least 1.5 g/cc, at least 2 g/cc, at least 2.5 g/cc, and/or at least 3 g/cc. Examples of an upper bound, or limit, on the desired density range include an upper bound of at most 6 g/cc, at most 5 g/cc, at most 4 g/cc, at most 3 g/cc, at most 2.0 g/cc, at most 1.9 g/cc, at most 1.8 g/cc, at most 1.7 g/cc, at most 1.6 g/cc, at most 1.5 g/cc, at most 1.4 g/cc, at most 1.3 g/cc, at most 1.2 g/cc, at most 1.1 g/cc, at most 1.0 g/cc, and/or at most 0.95 g/cc.

Examples of the polymeric material density include polymeric material densities of at least 0.85 g/cc, at least 0.86 g/cc, at least 0.87 g/cc, at least 0.88 g/cc, at least 0.89 g/cc, at least 0.9 g/cc, at least 0.91 g/cc, at least 0.92 g/cc, at least 0.93 g/cc, at least 0.94 g/cc, at least 0.95 g/cc, at most 0.96 g/cc, at most 0.97 g/cc, and/or at most 0.98 g/cc. Examples of the filler density include filler densities of at least 0.5 g/cc, at least 0.6 g/cc, at least 0.7 g/cc, at least 0.8 g/cc, at most 0.85 g/cc, at most 0.8 g/cc, and/or at most 0.75 g/cc. Additional and/or alternative examples of the filler density include filler densities of at least 2.0 g/cc, at least 2.1 g/cc, at least 2.2 g/cc, at least 2.3 g/cc, at least 2.5 g/cc, at least 3 g/cc, at least 3.5 g/cc, at most 9 g/cc, at most 8 g/cc, at most 7 g/cc, at most 6 g/cc, at most 5 g/cc, at most 4 g/cc, at most 3 g/cc, at most 2.75 g/cc, at most 2.5 g/cc, at most 2.25 g/cc, and/or at most 2 g/cc.

Each crosslinked polymer granule may have and/or define a corresponding granule density. In some examples, the corresponding granule density may be equal, or at least substantially equal, for each, or for every, crosslinked polymer granule. In some examples, a first subset of the plurality of crosslinked polymer granules may have and/or define a first granule density and a second subset of the plurality of crosslinked polymer granules may have and/or define a second granule density, which may differ from the first granule density.

The corresponding granule density of the plurality of crosslinked polymer granules may define, or may be referred to herein as defining, a granule density distribution. The granule density distribution may have and/or define any suitable distribution shape. Examples of the distribution shape include a constant distribution, an at least substantially constant distribution, a single-mode distribution, an at least substantially single-mode distribution, a multi-modal distribution, an at least substantially multi-modal distribution, a bimodal distribution, an at least substantially bimodal distribution, a trimodal distribution, an at least substantially trimodal distribution, a normal distribution, and/or an at least substantially normal distribution.

As used herein, the phrase "highly crosslinked" may be utilized to modify and/or to describe polymeric material and/or polymer granules that are at least partially formed from the polymeric material. Such polymeric material and/or polymer granules, when "highly crosslinked," include polyethylene polymer chains with a degree of crosslinking sufficient to provide the highly crosslinked polymeric material and/or the highly crosslinked polymer granules with one or more of the below-described properties. Stated another way, a degree of crosslinking needed to provide the polymeric material and/or the polymer granules with one or more of the below-described properties indicates that the polymeric material is a highly crosslinked polymeric material and/or that the polymer granules are highly crosslinked polymer granules in the context of the instant disclosure.

As an example, and upon fluid contact with naturally occurring liquid hydrocarbons, such as crude oil, within a hydrocarbon well, the crosslinked polymer granules disclosed herein may undergo less than a threshold increase in mass due to absorption of the naturally occurring liquid hydrocarbons. Examples of the threshold increase in mass include threshold increases of 0.05%, 0.1%, 0.25%, 0.5%, 0.75%, 1%, 2%, 3%, 4%, and/or 5%.

As another example, and upon fluid contact with crude oil for a time period of 8 weeks, at a temperature of 85 degrees Celsius, and under a uniaxial stress of 35 Megapascals, the crosslinked polymer granules disclosed herein undergo at most a threshold increase in strain. Examples of the threshold increase in strain include increases of 1%, 2%, 3%, 4%, 5%, 6%, 8%, and/or 10%.

As yet another example, and when subjected to a confining stress of 42 Megapascals at a temperature of 85 degrees Celsius, a monolayer of the crosslinked polymer granules disclosed herein defines at least a threshold fluid conductivity. Examples of the threshold fluid conductivity include fluid conductivities of $0.5 \times 10^4$ micrometers$^3$, $1.0 \times 10^4$ micrometers$^3$, $1.5 \times 10^4$ micrometers$^3$, $1.75 \times 10^4$ micrometers$^3$, $2 \times 10^4$ micrometers$^3$, $2.25 \times 10^4$ micrometers$^3$, $2.75 \times 10^4$ micrometers$^3$, $3 \times 10^4$ micrometers$^3$, $3.5 \times 10^4$ micrometers$^3$, $4 \times 10^4$ micrometers$^3$, $4.5 \times 10^4$ micrometers$^3$, $5 \times 10^4$ micrometers$^3$, and/or $6 \times 10^4$ micrometers$^3$.

As another example, the crosslinked polymer granules disclosed herein may have at least a threshold onset of melting temperature. Examples of the threshold onset of melting temperature include temperatures of 40 degrees Celsius, 45 degrees Celsius, 50 degrees Celsius, 55 degrees Celsius, 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, and/or 110 degrees Celsius.

As yet another example, the crosslinked polymer granules disclosed herein may have at least a threshold melting temperature. Examples of the threshold melting temperature include temperatures of 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, 110 degrees Celsius, 115 degrees Celsius, 120 degrees Celsius, 125 degrees Celsius, 130 degrees Celsius, and/or 135 degrees Celsius.

As another example, the crosslinked polymer granules disclosed herein may exhibit less than a threshold strain when subject to a stress of 35 Megapascals at a temperature of 85 degrees Celsius. Examples of the threshold strain include threshold strains of 40%, 39%, 38%, 37%, 36%, 35%, 34%, 33%, 32%, 31%, and/or 30%.

As yet another example, and when compared to analogous uncrosslinked polymer granules, the crosslinked polymer granules disclosed herein may exhibit at least a threshold decrease in strain when subject to a stress of 35 Megapascals at a temperature of 85 degrees Celsius. Examples of the threshold decrease in strain include decreases of 10%, 9%, 8%, 7%, 6%, 5%, 4%, 3%, and/or 2%.

As used herein, the phrase "analogous uncrosslinked polymer granule," when utilized to compare to the crosslinked polymer granules disclosed herein, may include an uncrosslinked polymer granule that has and/or defines an identical chemical structure to that of the crosslinked polymer granules with the exception that the uncrosslinked polymer granule does not include the plurality of chemical crosslinks. Stated another way, a granular polymeric material may be crosslinked to form and/or define the crosslinked polymer granules, and the analogous uncrosslinked polymer granules may refer to the granular polymeric material prior to being crosslinked to form the crosslinked polymer granules.

The highly crosslinked polymeric material and/or the crosslinked polymer granules disclosed herein may, in addition to one or more of the above-described properties, also, or optionally also, exhibit one or more of the below-described properties. As an example, the crosslinked polymer granules may define a granule density. Examples of the granule density include densities of at least 0.8 g/cc, at least 0.82 g/cc, at least 0.84 g/cc, at least 0.86 g/cc, at least 0.88 g/cc, at least 0.9 g/cc, at least 0.92 g/cc, at least 0.94 g/cc, at least 0.96 g/cc, at least 0.98 g/cc, at least 1 g/cc, at most 2.6 g/cc, at most 2.4 g/cc, at most 2.2 g/cc, at most 2 g/cc, at most 1.8 g/cc, at most 1.6 g/cc, at most 1.4 g/cc, at most 1.2 g/cc, at most 1.1 g/cc, at most 1 g/cc, at most 0.99 g/cc, at most 0.98 g/cc, at most 0.97 g/cc, and/or at most 0.96 g/cc.

As another example, and when compared to the analogous uncrosslinked polymer granules, the crosslinked polymer granules may resist fusing when exposed to a compressive force. Stated another way, fusing of the crosslinked polymer granules may be quantitatively less than fusing of the analogous uncrosslinked polymer granules. As examples, fusing of the crosslinked polymer granules may be at least 10% less, at least 20% less, at least 30% less, at least 40% less, at least 50% less, at least 60% less, at least 70% less, at least 80% less, and/or at least 90% less than fusing of the analogous uncrosslinked polymer granules when exposed to the compressive force.

As yet another example, and when compared to the analogous uncrosslinked polymer granules, the crosslinked polymer granules may resist flowing when exposed to the compressive force. Stated another way, the flow of the crosslinked polymer granules may be quantitatively less than the flow of the analogous uncrosslinked polymer granules. As examples, flow of the crosslinked polymer granules may be at least 10% less, at least 20% less, at least 30% less, at least 40% less, at least 50% less, at least 60% less, at least 70% less, at least 80% less, and/or at least 90% less than the flow of the analogous uncrosslinked polymer granules when exposed to the compressive force.

As another example, and when compared to the analogous uncrosslinked polymer granules, the crosslinked polymer granules may maintain fluid permeability when exposed to the compressive force. Stated another way, the fluid permeability of the crosslinked polymer granules may decrease to a lesser extent when compared to fluid permeability of the analogous uncrosslinked polymer granules. As examples, fluid permeability of the crosslinked polymer granules may decrease at least 10% less, at least 20% less, at least 30% less, at least 40% less, at least 50% less, at least 60% less, at least 70% less, at least 80% less, and/or at least 90% less than the fluid permeability of the analogous uncrosslinked polymer granules when exposed to the compressive force.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hydrocarbon well, comprising:
   a wellbore that that extends within a subsurface region;
   a downhole tubular that defines a tubular conduit and extends within the wellbore, wherein the downhole tubular includes a fluid-permeable segment; and
   a sand control structure positioned within an annular space that extends between the wellbore and the fluid-permeable segment, wherein the sand control structure is configured to restrict migration of formation sands from the subsurface region into the tubular conduit via the fluid-permeable segment, wherein the sand control structure includes a plurality of crosslinked polymer granules, wherein a characteristic dimension of each crosslinked polymer granule of the plurality of crosslinked polymer granules is at least 250 micrometers and at most 2 millimeters, and further wherein each crosslinked polymer granule contains a highly crosslinked polymeric material that includes:
   (i) a plurality of polyethylene polymer chains; and
   (ii) a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains.

2. The hydrocarbon well of claim 1, wherein at least one of:
   (i) the hydrocarbon well includes an open-hole completion section, and further wherein the fluid-permeable segment of the downhole tubular at least partially defines the open-hole completion section;
   (ii) the wellbore includes a horizontal portion, and further wherein the fluid-permeable segment of the downhole tubular is positioned within the horizontal portion of the wellbore; and
   (iii) the subsurface region includes an unconsolidated sand formation that at least partially defines the wellbore, and further wherein the sand control structure is positioned within the unconsolidated sand formation.

3. The hydrocarbon well of claim 1, wherein the fluid-permeable segment defines a downhole end region of the downhole tubular.

4. The hydrocarbon well of claim 1, wherein the fluid-permeable segment includes at least one of:
(i) a screen structure; and
(ii) a plurality of apertures that permits fluid flow into the tubular conduit.

5. The hydrocarbon well of claim 1, wherein the downhole tubular further includes a fluid-impermeable segment, wherein the fluid-impermeable segment defines an uphole end region of the downhole tubular.

6. The hydrocarbon well of claim 1, wherein the subsurface region defines a median formation grain diameter, and further wherein the characteristic dimension of each crosslinked polymer granule is at least one of:
(i) at least 3 times larger than the median formation grain diameter; and
(ii) at most 8 times larger than the median formation grain diameter.

7. The hydrocarbon well of claim 1, wherein a granule density of the plurality of crosslinked polymer granules is at least 0.9 grams per cubic centimeter.

8. The hydrocarbon well of claim 1, wherein a granule density of the plurality of crosslinked polymer granules is at most 2 grams per cubic centimeter.

9. A method of completing a hydrocarbon well, the method comprising:
positioning a downhole tubular within a wellbore of the hydrocarbon well, wherein the wellbore extends within a subsurface region, and further wherein the downhole tubular defines a tubular conduit and includes a fluid-permeable segment; and
providing a plurality of crosslinked polymer granules to an annular space that extends between the wellbore and the fluid-permeable segment to form a sand control structure that is configured to restrict migration of formation sands from the subsurface region and into the tubular conduit via the fluid-permeable segment, wherein a characteristic dimension of each crosslinked polymer granule of the plurality of crosslinked polymer granules is at least 250 micrometers and at most 2 millimeters, and further wherein each crosslinked polymer granule contains a highly crosslinked polymeric material that includes:
(i) a plurality of polyethylene polymer chains; and
(ii) a plurality of chemical crosslinks, wherein the plurality of chemical crosslinks includes chemical crosslinks that covalently bond a given polyethylene polymer chain of the plurality of polyethylene polymer chains to another polyethylene polymer chain of the plurality of polyethylene polymer chains.

10. The method of claim 9, wherein at least one of:
(i) the positioning includes positioning the fluid-permeable segment within a horizontal portion of the wellbore;
(ii) the positioning includes positioning the fluid-permeable segment within an open-hole portion of the wellbore; and
(iii) the subsurface region includes an unconsolidated sand formation that at least partially defines the wellbore, and further wherein the positioning includes positioning the fluid-permeable segment within the unconsolidated sand formation.

11. The method of claim 9, wherein the providing includes providing a slurry, which includes the plurality of crosslinked polymer granules and a carrier fluid, to the annular space.

12. The method of claim 11, wherein the providing includes depositing the plurality of crosslinked polymer granules within the annular space.

13. The method of claim 11, wherein a granule density of the plurality of crosslinked polymer granules is at least 80% and at most 120% of a carrier fluid density of the carrier fluid.

14. The method of claim 11, wherein the plurality of crosslinked polymer granules is at least substantially neutrally buoyant within the carrier fluid.

15. The method of claim 11, wherein the plurality of crosslinked polymer granules is positively buoyant within the carrier fluid.

16. The method of claim 11, wherein the plurality of crosslinked polymer granules is negatively buoyant within the carrier fluid.

17. The method of claim 11, wherein a positively buoyant fraction of the plurality of crosslinked polymer granules is positively buoyant within the carrier fluid, and further wherein a negatively buoyant fraction of the plurality of crosslinked polymer granules is negatively buoyant within the carrier fluid.

18. The method of claim 11, wherein the providing the plurality of crosslinked polymer granules includes providing a first slurry to the annular space and subsequently providing a second slurry to the annular space, wherein:
(i) the providing the first slurry includes forming a first portion of the sand control structure that is proximate a toe region of the wellbore; and
(ii) the providing the second slurry includes forming a second portion of the sand control structure that extends from the first portion of the sand control structure and a heel region of the wellbore.

19. The method of claim 18, wherein at least one of:
(i) the first slurry differs from the second slurry;
(ii) a first slurry density of the first slurry is greater than a second slurry density of the second slurry;
(iii) a first granule density of a first granule subset of the plurality of crosslinked polymer granules provided in the first slurry is greater than a second granule density of a second granule subset of the plurality of crosslinked polymer granules provided in the second slurry;
(iv) the first granule subset is negatively buoyant within a first corresponding carrier fluid; and
(v) the second granule subset is positively buoyant within a second corresponding carrier fluid.

20. The method of claim 11, wherein a first granule subset of the plurality of crosslinked polymer granules defines a first average granule density, wherein a second granule subset of the plurality of crosslinked polymer granules defines a second average granule density that is less than the first average granule density, and further wherein the providing includes providing such that the first granule subset is preferentially distributed within a toe region of the wellbore and the second granule subset is preferentially distributed between the toe region of the wellbore and a heel region of the wellbore.

21. The method of claim 20, wherein at least one of:
(i) the first average granule density is greater than a carrier fluid density of the carrier fluid; and
(ii) the second average granule density is less than the carrier fluid density of the carrier fluid.

* * * * *